United States Patent [19]
Couchman et al.

[11] 3,710,557
[45] Jan. 16, 1973

[54] AIR SAMPLING DEVICE

[75] Inventors: James C. Couchman, Fort Worth, Tex.; George W. Applebay, Albuquerque, N. Mex.

[73] Assignee: The United States of America as represented by the United States Atomic Energy Commission

[22] Filed: March 17, 1972

[21] Appl. No.: 235,785

Related U.S. Application Data

[63] Continuation of Ser. No. 33,752, May 1, 1970, abandoned.

[52] U.S. Cl. ............... 55/270, 55/468, 73/421.5 R, 417/179
[51] Int. Cl. .......................................... B01d 35/26
[58] Field of Search ............ 55/270, 468; 73/421.5 R; 417/179

[56] References Cited

UNITED STATES PATENTS

| 2,386,282 | 10/1945 | Watson et al. | 55/270 |
| 2,892,582 | 6/1959 | O'Rourke | 417/179 |
| 3,252,323 | 5/1966 | Torgeson | 73/421.5 R |
| 3,289,481 | 12/1966 | Barnes | 73/421.5 A |

*Primary Examiner*—Bernard Nozick
*Attorney*—Roland A. Anderson

[57] ABSTRACT

An air sampling device including a sampling duct containing a particulate filter and a venturi shroud surrounding the duct. Flow tubes are provided for delivering high velocity air from the venturi into the region behind the filter. Control jets in the region of the venturi constriction enable the effect of the venturi to be varied by the injection of pressurized air from an auxiliary source such as an aircraft cabin or the utilization of the siphon pumping action of the venturi.

10 Claims, 1 Drawing Figure

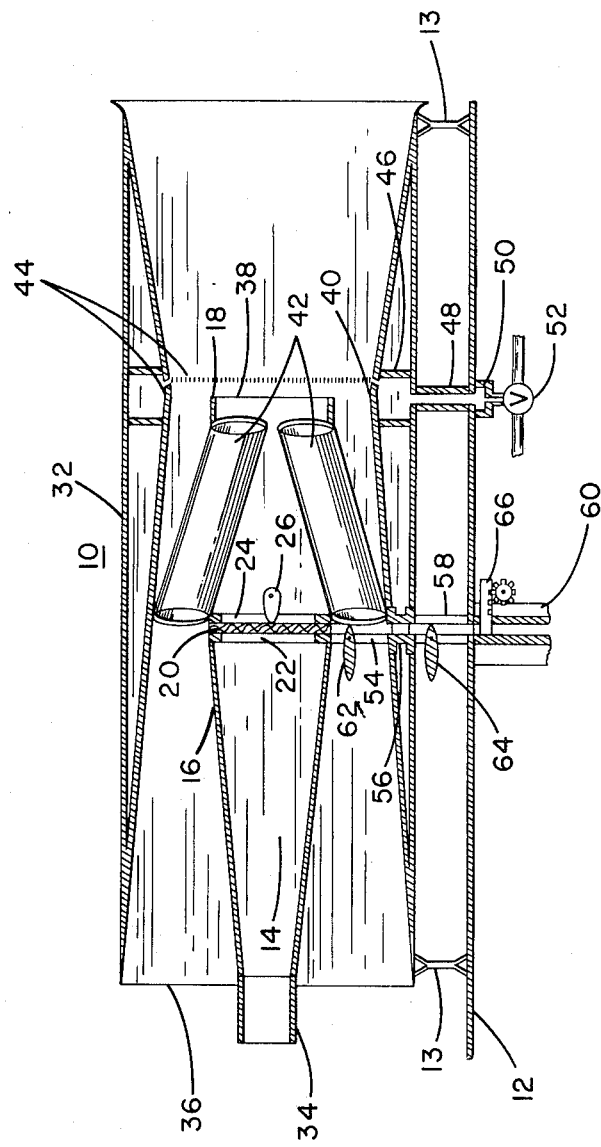
PATENTED JAN 16 1973
3,710,557
INVENTORS
JAMES C. COUCHMAN
GEORGE W. APPLEBAY
ATTORNEY

AIR SAMPLING DEVICE

This is a continuation of application, Ser. No. 33,752, filed May 1, 1970 now abandoned.

BACKGROUND OF THE INVENTION

The invention described herein was made in the course of or under Contract AT(29-1)-1183 with the U.S. Atomic Energy Commission. This invention relates to sampling devices of the type used for collecting particulate matter from the atmosphere. More particularly it relates to air sampling devices which experience high rates of airflow therethrough such as those used in conjunction with moving aircraft.

The use of aircraft mounted air samplers to obtain samples of the particulate matter contained in the atmosphere in order to identify the substances and their concentrations has become increasingly important. Reduced to simplest of terms, this type of sampler consists of a duct through which the sample of air passes and filter media positioned within the duct to retain the particulate matter. Collecting a representative sample of the particulate matter requires that no fractionation occur at the inlet of the system and that little or no plate-out loss occur in the duct leading to the filter media. This type of sampling, isokinetic sampling, demands that the linear velocity of air entering the inlet of the sampling duct be equal to the linear velocity of the air in the free stream. When the inlet velocity is greater than the velocity of the free stream, the sample collected will be distorted by favoring the smaller particles in the free stream. When the inlet velocity is less than the velocity of the free stream the sample collected will be distorted by favoring the larger particles.

Achieving isokinetic conditions requires that all losses in head in the inlet duct and the pressure drop across the filter be compensated. The difficulty of completely compensating for such losses increases as the rate of airflow through the sampler increases. Of course, high rates of flow increase the size of the sample and are desirable when particulate materials of very low concentrations are of interest. It is desirable that the means utilized to compensate for the head losses and pressure drop permit adjustment for varying conditions since the ability to sample over a range of airspeeds is usually necessary.

Some existing air samplers of the general type under consideration here have utilized vacuum pumps to provide a vacuum behind the filter in order to lower the exhaust pressure and achieve isokinetic conditions. However, when flow rates above about 50 cubic feet per minute (cfm) are of interest, the physical size (and weight) and the power requirements of a vacuum pump having sufficient capacity makes this arrangement impractical for use in aircraft in the size range normally considered for sampling operations.

SUMMARY OF INVENTION

Accordingly, it is an object of this invention to provide an improved isokinetic air sampling device. It is a further object of this invention to provide an air sampler which achieves isokinetic sampling conditions in an expeditious and efficient manner not requiring the use of a vacuum pump. It is additionally an object of the invention to provide an air sampler which can be operated at isokinetic conditions over a range of volume flows therethrough.

The above and other objects are obtained in an air sampler that combines a sampling duct containing a particulate filter with a venturi shroud surrounding the duct. A turbulence condition which, it is found, tends to build up behind filters of relatively large diameter is minimized by providing means for delivering high velocity air, which is in addition to the air passing through the filter, to the region directly behind the filter. This may be expeditiously accomplished by a plurality of tubes positioned so as to bleed air from the venturi into the outlet portion of the sampling duct. Control jets in the region of the venturi constriction enable the effect of the venturi to be varied by the injection of pressurized air or utilization of the siphon pumping action of the venturi.

The above and additional objects and advantages will appear and the summarized explanation understood from the following description of a preferred embodiment of the invention, the most novel features of which will be particularly pointed out hereinafter in the appended claims.

BRIEF DESCRIPTION OF DRAWING

The single FIGURE of drawing is a sectional view of a preferred embodiment of an air sampler in accordance with the invention.

DESCRIPTION OF PREFERRED EMBODIMENT

Referring now more specifically to the drawing, air sampler 10 is shown mounted on aircraft 12, only a small portion of which is shown, and fastened thereon by struts 13. Central sampling duct 14, shown in section on the drawing, has an air inlet portion 16, air outlet portion 18 and a filter 20 positioned therebetween by suitable means such as frames 22 and 24 and a looking apparatus shown schematically at 26. The efficiency of filter 20 is enhanced by making it larger than inlet nozzle 34 thereby lowering its face velocity. The cross-sectional area of inlet portion 16 is expanded accordingly. In a sampler designed to sample 1000 cmf at an air speed of 160 knots, the nozzle inlet was 3.4 and the filter 8 inches in diameter and inlet portion 16 expanded at a total angle of about 14°. Since turbulence tends to be a factor with expansion greater than 14°, that angle is considered to be close to optimum. A filter media well known in the air sampling art by the Institute of Paper Chemistry identification number IPC 1478 has been found to be most satisfactory for the high volumetric flows of interest. That media consists essentially of a cotton cloth mesh faced with a layer of a soft cotton fiber texture impregnated with dibutoryethyl phthalate.

Central duct 14 is positioned within venturi shroud 32 so that nozzle 34 extends forwardly of forward edge 36 to minimize the effect of any bow wave effect created in front of the venturi. Rear edge 38 of outlet portion 18 terminates at constriction 40 of venturi 32 in order to maximize the effect of the venturi on exhausting air from outlet portion 18. Tubes 42 are mounted in intersecting relationship with outlet portion 18 so as to bring high velocity air to the region behind filter 20. This added flow of high velocity air in outlet portion 18 greatly reduces the turbulence that builds up behind filters of relatively large size. In tests using venturi-powered air samplers with 8-inch diameter filters, flow through the filter was increased about 30 percent by the addition of four flow augmenting tubes 42.

While the arrangement illustrated in the drawing wherein the high velocity air delivered to outlet portion 18 is obtained from the venturi is considered to be preferred, it will be apparent that high velocity air flow could also be obtained from outside of the venturi or from the pressurized cabin of the aircraft.

The effectiveness of augmenting tubes 42 in reducing the turbulence behind the filter is enhanced by tubes 42 being positioned so that the area defined within the array of these tubes at their discharge ends approximates the area of the opening of inlet nozzle 34. Increasing the number of tubes 42 also increases the effectiveness of the additional air flow in reducing the turbulence, since the additional air flow is most effective at its circumference.

Injection jets 44 near the venturi constriction provide a means for exercising control over the flow through the venturi. Jets 44 are in fluid flow communication with the cabin of the aircraft through frame ring 46, conduit 48, adapter 50 and valve 52. Accordingly, pressurized cabin air may be supplied through jets 44 to increase the effect of the venturi flow on the air passing through filter 20. Alternatively, valve 52 may be manipulated to connect the jets with vacuum operated equipment (not shown) in the aircraft whereby the venturi acts as a siphon pump to provide the necessary power. Argumenting tubes 42 have proven so effective in achieving isokinetic flow, that the vacuum power obtainable through jets 44 will be utilized under most operating conditions. It will be appreciated that the flow velocity at inlet nozzle 34 vis-a-vis the free stream may be readily obtained by the appropriate placement of Pitot tubes, static ports, or other velocity (pressure) responsive devices (not shown) and that the manipulation of valve 52 can be made responsive thereto.

In most applications it will be desirable to remove and exchange filters while in flight. This may be accommodated by suitable guide frames 54,56,58 and 60, and sliding pressure lock valve 66 inside of the aircraft. Doors 62 and 64 shown in an open position on the drawing are closed by means operable from the aircraft (not shown) during movement of the filter.

While the fundamental novel features of the invention have now been shown and described applied to a preferred embodiment, it will be understood that various omissions and substitutions and changes may be made by those skilled in the art within the principle and scope of the invention as expressed in the appended claims.

What is claimed is:

1. An air sampling device comprising:
   a. a sampling duct having an air inlet portion and an air outlet portion,
   b. a filter positioned across said duct between said inlet and said outlet portions,
   c. venturi shroud surrounding said duct and coaxial therewith and spaced from said duct so that the venturi action of said shroud exhausts air from said outlet portion when air flows through said shroud and said duct, and
   d. conduit means connecting said outlet portion to a source of high velocity air for delivering into said outlet portion a flow of high velocity air from said source which is in addition to the flow of air through said filter but in the same general direction therewith.

2. The air sampling device of claim 1 including jets in said venturi shroud in the region of the venturi constriction and fluid flow communicating means in connection with said jets whereby said jets may be connected to a source of pressurized air or to vacuum operated equipment external to said air sampling device.

3. The air sampling device of claim 2 wherein said means for delivering said additional flow of air include a plurality of tubes mounted in intersecting relationship with said outlet portion so as to bring air from said venturi to the region behind said filter with the area defined within the array of said tubes at their discharge ends approximating the area of the opening of said inlet nozzle.

4. The air sampling device of claim 1 wherein said means for delivering said additional flow of air include at least one tube mounted in intersecting relationship with said outlet portion so as to bring air from said venturi shroud to the region behind said filter.

5. The air sampling device of claim 1 wherein said inlet portion has an inlet nozzle which extends forwardly of the forward edge of said venturi shroud.

6. The air sampling device of claim 5 wherein said filter is larger than the area of the opening of said nozzle and the cross-sectional area of said inlet portion increases with distance from said inlet nozzle along at least a portion of its length.

7. The air sampling device of claim 6 wherein said outlet portion terminates in the region of the constriction of said venturi shroud.

8. The air sampling device of claim 6 wherein said means for delivering said additional flow of air include at least one tube mounted in intersecting relationship with said outlet portion so as to bring air from said venturi shroud to the region behind said filter.

9. The air sampling device of claim 7 wherein said means for delivering said additional flow of air include a plurality of tubes mounted in intersecting relationship with said outlet portion so as to bring air from said venturi to the region behind said filter with the area defined within the array of said tubes at their discharge ends approximating the area of the opening of said inlet nozzle.

10. The air sampling device of claim 9 wherein the cross-sectional area of said inlet portion expands at a total angle not exceeding about 14° and including jets in said venturi shroud in the region of the venturi constriction and fluid flow communicating means in connection with said jets whereby said jets may be connected to a source of pressurized air or to vacuum operated equipment external to said sampling device.

* * * * *